(No Model.)
D. C. SHANNON.
STOCK MARKER.
No. 573,110. Patented Dec. 15, 1896.
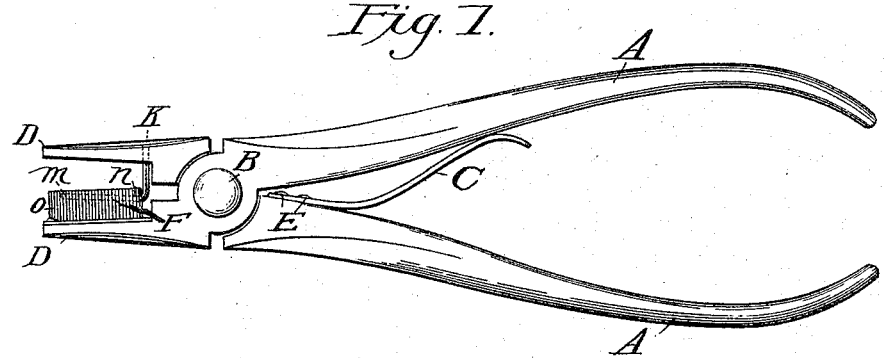
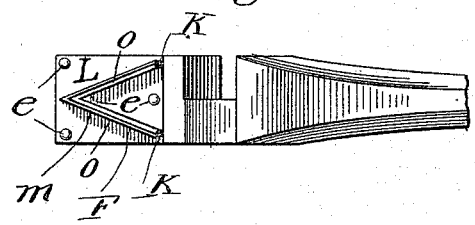
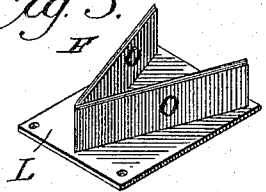
Witnesses.
J. W. Wilson
J. C. Wilson
Inventor.
Dewitt Clinton Shannon.

UNITED STATES PATENT OFFICE.

DEWITT CLINTON SHANNON, OF CHEROKEE CITY, ARKANSAS.

STOCK-MARKER.

SPECIFICATION forming part of Letters Patent No. 573,110, dated December 15, 1896.

Application filed February 7, 1896. Serial No. 578,411. (No model.)

*To all whom it may concern:*

Be it known that I, DEWITT CLINTON SHANNON, a citizen of the United States, residing at Cherokee City, in the county of Benton and State of Arkansas, have invented a new and useful Stock-Marker; and I do hereby declare the following to be a full, clear, and exact description of the invention, such as will enable others skilled in the art to which it appertains to make and use the same.

My invention relates to stock markers or punchers.

My object is to provide a stock-marker of extremely simple and cheap construction, which will be adapted for quick and easy manipulation to mark the animal in a highly superior manner, and of such novel construction that the piece cut from the animal will be automatically removed after the operation has been accomplished.

Having this object in view my invention consists of a stock-marker of novel and peculiar construction, as will appear more in detail hereinafter.

In the accompanying drawings, Figure 1 is a view in side elevation of my improved marker; Fig. 2, a top detail view showing the fastening-plate and cutting-knife, and Fig. 3 a perspective detail view of the same.

A A designate the handles of a pair of pincers, which are provided with jaws D D, the members of the pincers being pivoted together on a bolt or rivet B.

C designates a ribbon-spring which is fastened to the lower member A by series of fastening devices E and has its free end pressing against the other member. This spring tends to keep the jaws normally separated.

L designates a fastening-plate which is provided with a V-shaped slot having its apex pointing toward the outer end of the lower jaw D. At *e e* are shown a series of fastening-screws, which pass through said plate and secure it to the lower jaw D. The cutting blade or knife is shown at O O, said knife being in the shape of a letter V and secured in the V-shaped slot of the fastening-plate in any preferred manner. This knife is made of a single piece of metal having its upper edge sharpened.

F designates my improved extractor, which is made from a single piece of metal. This extractor has an upwardly-extending portion, which is secured to the upper jaw D in any preferred manner, and it is bent at *n* at right angles to the aforementioned portion and is made into a V-shaped extracting-blade, which snugly fits within the cutting-blade, its point being shown at *m*.

The operation is simple and as follows: When the handles A A are grasped, the extractor passes through the cutting-blade and the ear of the animal is inserted between the latter and the upper jaw D. Upon closing the members A A farther together the knife cuts through the animal's ear until it strikes the upper jaw D. The portion cut out from the ear remains in the cutting-blade until the grasp is released and the handles parted, whereupon the spring C exerts its force, spreads the jaws, and the extractor is pulled up, thereby forcing the cut-out piece from the knife.

There are many slight and immaterial changes of construction that might be resorted to in carrying out my invention, and hence it is to be understood that I do not limit myself to the precise construction herein shown and described, but consider that I am entitled to all such variations as come properly within the spirit and scope of the invention.

Having thus described my invention, what I claim as new, and desire to secure by Letters Patent, is—

1. In a stock-marker, the combination with members pivoted together and provided with jaws, of an open cutting knife or blade secured to one of said jaws, and an extractor connected to the other jaw and adapted to operate in said cutting-knife to remove therefrom the piece cut from the animal.

2. In a stock-marker, the combination with members pivoted together and provided with jaws, of a V-shaped cutting blade or knife secured to one of said jaws, and an extractor fastened to the other jaw and fitting snugly in the cutting-blade.

3. In a stock-marker, the combination with members pivoted together and provided with jaws, of a bent cutting-blade secured to one of said jaws and an extractor having a vertically-extending portion connected to the other jaw and a horizontally-extending portion fitting snugly within and adapted for movement in the cutting-blade.

4. In a stock-marker, the combination with members pivoted together and provided with jaws, of a spring for keeping said jaws normally separated, a fastening-plate secured to one of the jaws, a V-shaped cutting-blade connected to the fastening-plate, and an extractor bent into substantially right-angular shape and having one portion connected to the other jaw and the other portion fitting snugly within and movable in the cutting blade or knife.

5. In a stock-marker, the combination with members pivoted together and provided with jaws, of a fastening-plate secured to one of the members and provided with a bent slot, and a bent or open cutting-knife received in the slot and secured to the fastening-plate.

In testimony whereof I affix my signature in the presence of two witnesses.

DEWITT CLINTON SHANNON.

Witnesses:
   J. W. WILSON,
   J. C. WILSON.